United States Patent
Baylon et al.

(10) Patent No.: US 9,774,853 B2
(45) Date of Patent: Sep. 26, 2017

(54) DEVICES AND METHODS FOR SAMPLE ADAPTIVE OFFSET CODING AND/OR SIGNALING

(71) Applicant: Google Technology Holdings LLC, Mountain View, CA (US)

(72) Inventors: David M. Baylon, San Diego, CA (US); Koohyar Minoo, San Diego, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 737 days.

(21) Appl. No.: 13/672,476

(22) Filed: Nov. 8, 2012

(65) Prior Publication Data

US 2013/0114677 A1 May 9, 2013

Related U.S. Application Data

(60) Provisional application No. 61/557,409, filed on Nov. 8, 2011, provisional application No. 61/559,714, filed
(Continued)

(51) Int. Cl.
*H04N 7/26* (2006.01)
*H04N 19/119* (2014.01)
(Continued)

(52) U.S. Cl.
CPC ......... *H04N 19/119* (2014.11); *H04N 19/117* (2014.11); *H04N 19/147* (2014.11);
(Continued)

(58) Field of Classification Search
CPC .. H04N 19/119; H04N 19/117; H04N 19/147; H04N 19/176; H04N 19/44;
(Continued)

(56) References Cited

U.S. PATENT DOCUMENTS 5,446,806 A 8/1995 Ran et al.
5,859,979 A 1/1999 Tung et al.
(Continued)

FOREIGN PATENT DOCUMENTS

WO WO2011127961 10/2011
WO 2013103892 A1 7/2013

OTHER PUBLICATIONS

Chih-Ming Fu et al. Sample Adaptive Offset for HEVC, Mediateck inc. No. 1, Dusing Rd. 1, Hsinchu Science Park, Hsinchu, Taiwan 30078, Oct. 17-19, 2011.*
(Continued)

*Primary Examiner* — Tung Vo
*Assistant Examiner* — Joseph Becker
(74) *Attorney, Agent, or Firm* — Young, Basile, Hanlon & MacFarlane, P.C.

(57) ABSTRACT

In one embodiment, a method for decoding a video bitstream comprises the steps of: (a) receiving a video bitstream; (b) deriving processed video data from the bitstream; (c) partitioning the processed video data into blocks, wherein each of the blocks is equal to or smaller than a picture; (d) deriving an SAO type from the video bitstream for each of the blocks, wherein the SAO type is associated with a specific nonbiased coding scheme; (e) determining an SAO sub-class associated with the SAO type for each of the pixels in each of the blocks; (f) deriving intensity offset from the video bitstream for the sub-class associated with the SAO type; and (g) applying SAO compensation to each of the pixels in a processed video block, wherein the SAO compensation is based on the intensity offset of step (f).

17 Claims, 9 Drawing Sheets

Related U.S. Application Data on Nov. 14, 2011, provisional application No. 61/638,480, filed on Apr. 25, 2012.

(51) Int. Cl.

| H04N 19/176 | (2014.01) |
|---|---|
| H04N 19/147 | (2014.01) |
| H04N 19/117 | (2014.01) |
| H04N 19/70 | (2014.01) |
| H04N 19/91 | (2014.01) |
| H04N 19/44 | (2014.01) |
| H04N 19/82 | (2014.01) |
| H04N 19/86 | (2014.01) |

(52) U.S. Cl.
CPC ........... *H04N 19/176* (2014.11); *H04N 19/44* (2014.11); *H04N 19/70* (2014.11); *H04N 19/82* (2014.11); *H04N 19/86* (2014.11); *H04N 19/91* (2014.11)

(58) Field of Classification Search
CPC ........ H04N 19/70; H04N 19/82; H04N 19/86; H04N 19/91
USPC .................................................... 375/240.01
See application file for complete search history.

(56) References Cited

U.S. PATENT DOCUMENTS

| 7,782,722 | B2 | 8/2010 | Miyaoka |
| 8,259,808 | B2 | 9/2012 | Lin et al. |
| 8,351,310 | B2 | 1/2013 | Feng |
| 8,660,174 | B2 | 2/2014 | Fu et al. |
| 8,861,617 | B2 | 10/2014 | Chen et al. |
| 9,001,883 | B2 | 4/2015 | Tsai et al. |
| 9,008,170 | B2 | 4/2015 | Chong et al. |
| 9,161,035 | B2 | 10/2015 | Maani et al. |
| 2011/0305274 | A1 | 12/2011 | Fu et al. |
| 2012/0082232 | A1 | 4/2012 | Sole Rojals et al. |
| 2012/0207227 | A1 | 8/2012 | Tsai et al. |
| 2012/0287988 | A1 | 11/2012 | Chong et al. |
| 2012/0294353 | A1 | 11/2012 | Fu et al. |
| 2013/0002213 | A1 | 1/2013 | Khare et al. |
| 2013/0003829 | A1 | 1/2013 | Misra et al. |
| 2013/0022103 | A1 | 1/2013 | Budagavi |
| 2013/0114674 | A1 | 5/2013 | Chong et al. |
| 2013/0114678 | A1 | 5/2013 | Baylon et al. |
| 2013/0151486 | A1 | 6/2013 | Narasimhan et al. |
| 2013/0163660 | A1* | 6/2013 | Boyce et al. ............. 375/240.02 |
| 2013/0177067 | A1 | 7/2013 | Minoo et al. |
| 2013/0177068 | A1 | 7/2013 | Minoo et al. |
| 2013/0188741 | A1 | 7/2013 | Minoo et al. |
| 2013/0208788 | A1 | 8/2013 | Chen et al. |
| 2013/0266058 | A1 | 10/2013 | Minoo et al. |
| 2014/0177704 | A1 | 6/2014 | Pu et al. |
| 2014/0334559 | A1 | 11/2014 | Kim et al. |

OTHER PUBLICATIONS

Bross et al., "High-Efficiency Video Coding", Joint Collaborative Team on Video Coding (JCT-VC) JCTVCF803 of ITU-T SG16 WP3 and ISO/IEC JTC1/SC29/WG11 6th Meeting: Torino, IT Jul. 14-22, 2011.
ISR, & Written Opinion of the International Searching Authority for International Application No. ISR/US2013/020387 (CS9714), Apr. 4, 2013, 15 pages.
Laroche (Canon) G et al.: "On additional SAO Band Offset classifications", 7 JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T-SG.16); URL:http://wftp3.itu.int/av-arch/jctvc-site/,, No. JCTV-G246, Nov. 8, 2011, all pages.
Marta Mrak et al.: "CE6: Report and evaluation of new combined intra prediction settings", 4 JCT-VC Meeting; 95, MPEG Meeting; Jan. 20, 2011-Jan. 28, 2011; DAEGU; (Joing Collaborative Team on Video Coding of ISO/IEC JTC1/SC29/WG11 and ITU-T SG. 16); URL: http://wftp3.itu.int/av-arch/jctvc-site/,, No. JCTVC-D191, Jan. 15, 2011, all pages.
McCann et al., "Samsung's Response to the call for proposals on video compression technology" JCTVC of ITU-T SG16 WP3 and ISO/IEC JTC1/SC29/WG11; 1st meeting; Dresden, DE, Apr. 15-23, 2010; 42 pages.
Segall (Sharp) A et al.: Video Coding technology proposal by Sharp, 1. JCT-VC Meeting; Apr. 15, 2010-Apr. 23, 2010; Dresden; (Joint Collaborative Team on Video Coding of ISO/IEC TTC1/SC29/WG11 and ITU-T SG16); URL: http://wftp3.itu.int/av-arch/JCTVC-site/, No. JCTVC-A105, Apr. 22, 2010 (Apr. 22, 2010, all pageS.
Wang Lai et al., "CE8 Subtest 1: Block-based filter adaptation with features on subset of pixels" Joint Collaborative Team on video Coding of ITU-T SG16 WP3 and ISO/IEC JTC1/SC29/WG11; 6th meeting: Torino, Italy: Jul. 14-22, 2011; JCTVCF301; 6 pages.
Yamakage et al., "Description of Core Experiment 8 (CD8): Non-deblocking loop filtering" Joint Collaborative Team on video Coding (JCTVC-G1208) of ITU-T SG16 WP3 and ISO/IEC JTC1/SC29/WG11; 6th meeting; Torino IT; Jul. 14-22, 2011; 12 pages.
C-Ming Fu et al.: "TE10 subtest 3: Quadtree-based adaptive offset", 94, MPEG Meeting; Oct. 11, 2010-Oct. 15, 2010; Guangzhou; (Motion Picture Expert Group or ISO/IEC JTC1/SC29/WG11), No. M18173, Oct. 28, 2010, all pages.
Chih-Ming Fu et al: "Sample adaptive offset for HEVC", Multimedia Signal Processing (MMSP), 2011 IEEE 13th International Workshop on, IEEE, Oct. 17, 2011, all pages.
C-M Fu et al.: "CE8 Subtest3: Picture Quadtree Adaptive Offset", 4, JCT-VC Meeting; 95, MPEG Meeting; Jan. 20, 2011-Jan. 28, 2011; Daegu; (Joint Collaborative Team on Video Coding of ISO/IEC JTC1/SC29/WG11and ITU-T SG.16); URL:http://wftp3.itu.int/av-arch/jctvc-site/, No. JCTV-D122, Jan. 15, 2011, all pages.
McCann K et al.: "HM4: HEVC Test Model 4 Encoder Description", 6, JCT-VC Meeting; 97, MPEG Meeting; Jul. 14, 2011-Jul. 22, 2011; Torino; (Joint Collaborative Team on Video Coding of ISO/IEC JTCC1/SC29/WG11 and ITU-T SG.16); URL:http://wftp3.itu.int/av-arch/jctvc-site/, No. JCTVC-F802, Oct. 4, 2011, all pages.
C-M Fu et al: "Sample Adaptive Offset for Chroma", 6, JCT-VC Meeting: 97, MPEG Meeting Jul. 14, 2011-Jul. 22, 2011, Torino; (Joint Collaborative Team on Video Coding of ISO/IEC JTC1/SC29/WG11 and ITU-T SG.16); URL: http://wftp3.itu.int/av-arch/jctvc-site/, No. JCTVC-F057, Jul. 20, 2011, all pages.
Koohyar Minoo et al.: "CE8.e.4 Selection and Coding of SAO Parameters", 8 JCT-VC Meeting; 99, MPEG Meeting; Jan. 2, 2012-Jan. 2, 2012; San Jose; (Joint Collaborative Team on Vidoe Coding of ISO/IEC JTC1/SC29/WG11 and ITU-T SG.16); URL: http://wftp3.itu.int/av-arch/jctvc-site/, No. JCTVC-H0557, Jan. 21, 2012, all pages.
Patent Cooperation Treaty, International Search Report and Written Opinion of the International Searching Authority for International Application No. PCT/US2012/064208 (CS39515), Jul. 26, 2013, 13 pages.
Bankoski et al. "Technical Overview of VP8, An Open Source Video Codec for the Web". Dated Jul. 11, 2011.
Bankoski et al. "VP8 Data Format and Decoding Guide" Independent Submission. RFC 6389, Dated Nov. 2011.
Bankoski et al. "VPS Data Format and Decoding Guide; draft-bankoski-vp8-bitstream-02" Network Working Group. Internet-Draft, May 18, 2011, 288 pp.
Chih-Ming Fu, et al., "TE 10 Subest 3: Quadtree-based Adaptive Offset," JCTVC-C147, pp. 1-6, 3rd Meeting: Guangzhou, China, Oct. 7-15, 2010.
Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.

(56) References Cited

OTHER PUBLICATIONS

Overview; VP7 Data Format and Decoder. Version 1.5. On2 Technologies, Inc. Dated Mar. 28, 2005.
Series H: Audiovisual and Multimedia Systems; Infrastructure of audiovisual services—Coding of moving video. H.264. Advanced video coding for generic audiovisual services. International Telecommunication Union. Version 11. Dated Mar. 2009.
Series H: Audiovisual and Multimedia Systems; Infrastructure of audiovisual services—Coding of moving video. H.264. Advanced video coding for generic audiovisual services. International Telecommunication Union. Version 12. Dated Mar. 2010.
Series H: Audiovisual and Multimedia Systems; Infrastructure of audiovisual services—Coding of moving video. H.264. Amendment 2: New profiles for professional applications. International Telecommunication Union. Dated Apr. 2007.
Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.
Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.
Series H: Audiovisual and Multimedia Systems; Infrastructure of audiovisual services—Coding of moving video; Advanced video coding for generic audiovisual services. H.264. Version 1. International Telecommunication Union. Dated May 2003.
Series H: Audiovisual and Multimedia Systems; Infrastructure of audiovisual services—Coding of moving video; Advanced video coding for generic audiovisual services. H.264. Version 3. International Telecommunication Union. Dated Mar. 2005.
VP6 Bitstream & Decoder Specification. Version 1.02. On2 Technologies, Inc. Dated Aug. 17, 2006.
VP6 Bitstream & Decoder Specification. Version 1.03. On2 Technologies, Inc. Dated Oct. 29, 2007.
VP8 Data Format and Decoding Guide. WebM Project. Google On2. Dated: Dec. 1, 2010.

* cited by examiner

ENCODER TRANSMITS: 2, -1, ESCAPE
DECODER RECEIVES: 2, -1, ESCAPE
DECODER HAS PIXEL INTENSITIES IN SUB-CLASSES 1 AND 6 ONLY, ASSIGNS
    OFFSET 2 TO SUB-CLASS 1, AND OFFSET -1 TO SUB-CLASS 6

DEVICES AND METHODS FOR SAMPLE ADAPTIVE OFFSET CODING AND/OR SIGNALING

CROSS-REFERENCE TO RELATED APPLICATIONS

The present application claims the benefit of U.S. provisional patent application No. 61/557,409, entitled "Coding and Selection of SAO Parameters" filed Nov. 8, 2011, U.S. provisional patent application No. 61/559,714, entitled "Coding and Selection of SAO Parameters" filed Nov. 14, 2011, and U.S. provisional patent application No. 61/638,480, entitled "SAO Type Coding Syntax" filed Apr. 25, 2012, which are incorporated herein by reference in their entirety.

FIELD

The disclosure relates generally to the field of video coding, and more specifically to systems, devices and methods for sample adaptive offset (SAO) coding and/or signaling.

BACKGROUND

Video compression uses block processing for many operations. In block processing, a block of neighboring pixels is grouped into a coding unit and compression operations treat this group of pixels as one unit to take advantage of correlations among neighboring pixels within the coding unit. Block-based processing often includes prediction coding and transform coding. Transform coding with quantization is a type of data compression which is commonly "lossy" as the quantization of a transform block taken from a source picture often discards data associated with the transform block in the source picture, thereby lowering its bandwidth requirement but often also resulting in quality loss in reproducing of the original transform block from the source picture.

MPEG-4 AVC, also known as H.264, is an established video compression standard that uses transform coding in block processing. In H.264, a picture is divided into macroblocks (MBs) of 16×16 pixels. Each MB is often further divided into smaller blocks. Blocks equal in size to or smaller than a MB are predicted using intra-/inter-picture prediction, and a spatial transform along with quantization is applied to the prediction residuals. The quantized transform coefficients of the residuals are commonly encoded using entropy coding methods (e.g., variable length coding or arithmetic coding). Context Adaptive Binary Arithmetic Coding (CABAC) was introduced in H.264 to provide a substantially lossless compression efficiency by combining an adaptive binary arithmetic coding technique with a set of context models. Context model selection plays a role in CABAC in providing a degree of adaptation and redundancy reduction. H.264 specifies two kinds of scan patterns over 2D blocks. A zigzag scan is used for pictures coded with progressive video compression techniques and an alternative scan is for pictures coded with interlaced video compression techniques.

HEVC (High Efficiency Video Coding), an international video coding standard developed to succeed H.264, extends transform block sizes to 16×16 and 32×32 pixels to benefit high definition (HD) video coding.

BRIEF DESCRIPTION OF THE DRAWINGS

The details of the present disclosure, both as to its structure and operation, may be understood in part by study of the accompanying drawings, in which like reference numerals refer to like parts. The drawings are not necessarily to scale, emphasis instead being placed upon illustrating the principles of the disclosure.

BRIEF SUMMARY

Figure 1A:
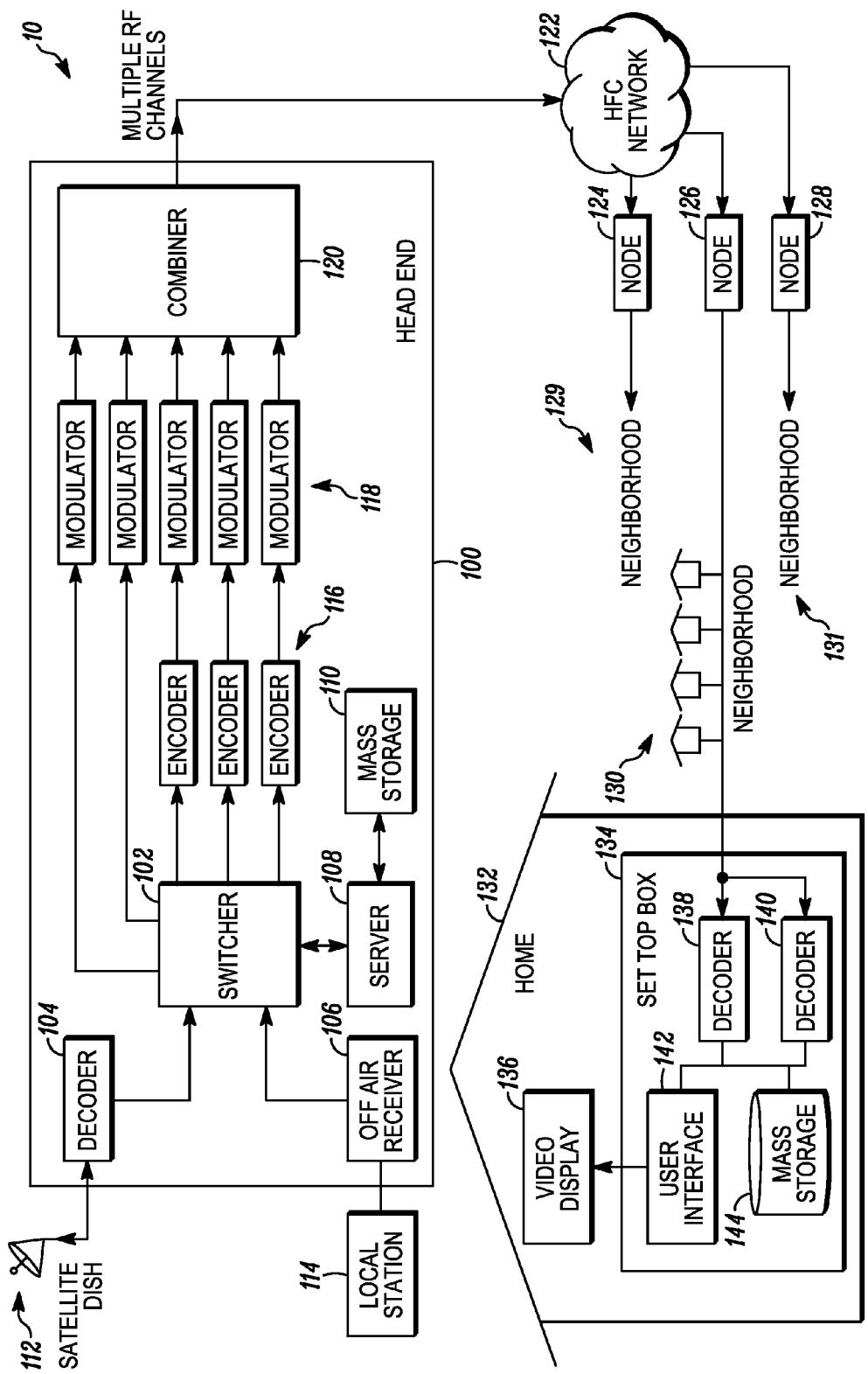
FIG. 1A is a video system in which the various embodiments of the disclosure may be used.

Accordingly, there is provided herein systems and methods that improve video quality by selection, coding, and signaling of parameters in a sample adaptive offset (SAO) process. The methods and systems described herein generally pertain to video processing such as video encoders and decoders.

In a first aspect, a method for decoding a video bitstream having a plurality of pictures, the bitstream generated by a video coding system with sample adaptive offset (SAO) is provided, the method comprising the steps of: (a) receiving a video bitstream; (b) deriving processed video data from the bitstream; (c) partitioning the processed video data into blocks, wherein each of the blocks is equal to or smaller than a picture; (d) deriving an SAO type from the video bitstream for each of the blocks, wherein the SAO type is associated with a specific nonbiased coding scheme; (e) determining an SAO sub-class associated with the SAO type for each of the pixels in each of the blocks; (f) deriving intensity offset from the video bitstream for the sub-class associated with the SAO type; and (g) applying SAO compensation to each of the pixels in a processed video block, wherein the SAO compensation is based on the intensity offset of step (f). In an embodiment of the first aspect, the SAO coding type is selected from the group consisting of one or more edge offset (EO) types and one or more band offset (BO) types. In an embodiment of the first aspect, the EO types include at least four edge offset types. In an embodiment of the first aspect, the BO types include at least one band offset type. In an embodiment of the first aspect, the specific nonbiased coding scheme associated with the SAO types includes a binary coding scheme having at least 2 units in each codeword. In an embodiment of the first aspect, each codeword is associated with an individual SAO type. In an embodiment of the first aspect, the codeword includes a distinct first unit to identify if the SAO type is on or off. In an embodiment of the first aspect, the codeword further includes a distinct second unit to identify if the SAO type is BO type or EO type. In an embodiment of the first aspect, the codeword further includes a distinct third unit to identify which type of EO type. In an embodiment of the first aspect, at least one of the units in the codeword is encoded using Context Adaptive Binary Arithmetic Coding (CABAC). In an embodiment of the first aspect, a distinct third unit consists of two binary digits to identify one of four EO types. In an embodiment of the first aspect, the specific nonbiased coding scheme associated with the SAO types includes one or more flags associated with each of the SAO coding types. In an embodiment of the first aspect, the BO type and EO type can be signaled using an SAO band flag. In an embodiment of the first aspect, the SAO sub-class type can be signaled using an SAO edge type flag. In an embodiment of the first aspect, the SAO coding type can be signaled for a color coding component. In an embodiment of the first aspect, the method is implemented on a computer having a processor and a memory coupled to said processor, wherein at least some of steps (a) through (g) are performed using said processor.

In a second aspect, an apparatus for decoding a video bitstream having a plurality of pictures, the bitstream generated by a video coding system with sample adaptive offset (SAO) is provided, the apparatus comprising a video decoder configured to: (a) receive a video bitstream; (b) derive processed video data from the bitstream; (c) partition the processed video data into blocks, wherein each of the blocks is equal to or smaller than a picture; (d) derive an SAO type from the video bitstream for each of the blocks, wherein the SAO type is associated with a specific nonbiased coding scheme; (e) determine an SAO sub-class associated with the SAO type for each of the pixels in each of the blocks; (f) derive intensity offset from the video bitstream for the sub-class associated with the SAO type; and (g) apply SAO compensation to each of the pixels in a processed video block, wherein the SAO compensation is based on the intensity offset of step (f). In an embodiment of the second aspect, the apparatus comprises at least one of: an integrated circuit; a microprocessor; and a wireless communication device that includes the video decoder. In an embodiment of the second aspect, the SAO coding type is selected from the group consisting of one or more edge offset (EO) types and one or more band offset (BO) types. In an embodiment of the second aspect, the specific nonbiased coding scheme associated with the SAO types includes a binary coding scheme having at least 2 units in each codeword. In an embodiment of the second aspect, the EO types and BO types are represented by code words that are roughly equivalent size.

In a third aspect, a method of encoding video data having a plurality of pictures, using sample adaptive offset (SAO) is provided, the method comprising the steps of: (a) partitioning video data into blocks, wherein each of the blocks is equal to or smaller than a picture; (b) selecting an SAO type for the video data for each of the blocks, wherein the SAO type is associated with a specific nonbiased coding scheme; (c) selecting an SAO sub-class associated with the SAO type for each of the pixels in each of the blocks; (d) determining intensity offset for the video data for the sub-class associated with the SAO type; and (e) applying SAO compensation to each of the pixels in a processed video block, wherein the SAO compensation is based on the intensity offset of step (d). In an embodiment of the third aspect, the method is implemented on a computer having a processor and a memory coupled to said processor, wherein at least some of steps (a) through (e) are performed using said processor.

DETAILED DESCRIPTION

In this disclosure, the term "coding" refers to encoding that occurs at the encoder or decoding that occurs at the decoder. Similarly, the term coder refers to an encoder, a decoder, or a combined encoder/decoder (CODEC). The terms coder, encoder, decoder and CODEC all refer to specific machines designed for the coding (encoding and/or decoding) of video data consistent with this disclosure.

The present discussion begins with a very brief overview of some terms and techniques known in the art of digital image compression. This overview is not meant to teach the known art in any detail. Those skilled in the art know how to find greater details in textbooks and in the relevant standards.

An example of a video system in which an embodiment of the disclosure may be used will now be described. It is understood that elements depicted as function blocks in the figures may be implemented as hardware, software, or a combination thereof. Furthermore, embodiments of the disclosure may also be employed on other systems, such as on a personal computer, smartphone or tablet computer.

Referring to FIG. 1A, a video system, generally labeled 10, may include a head end 100 of a cable television network. The head end 100 may be configured to deliver video content to neighborhoods 129, 130 and 131. The head end 100 may operate within a hierarchy of head ends, with the head ends higher in the hierarchy generally having greater functionality. The head end 100 may be communicatively linked to a satellite dish 112 and receive video signals for non-local programming from it. The head end 100 may also be communicatively linked to a local station 114 that delivers local programming to the head end 100. The head end 100 may include a decoder 104 that decodes the video signals received from the satellite dish 112, an off-air receiver 106 that receives the local programming from the local station 114, a switcher 102 that routes data traffic among the various components of the head end 100, encoders 116 that encode video signals for delivery to customers, modulators 118 that modulate signals for delivery to customers, and a combiner 120 that combines the various signals into a single, multi-channel transmission.

The head end 100 may also be communicatively linked to a hybrid fiber cable (HFC) network 122. The HFC network 122 may be communicatively linked to a plurality of nodes 124, 126, and 128. Each of the nodes 124, 126, and 128 may be linked by coaxial cable to one of the neighborhoods 129, 130 and 131 and deliver cable television signals to that neighborhood. One of the neighborhoods 130 of FIG. 1A is shown in more detail. The neighborhood 130 may include a number of residences, including a home 132 shown in FIG. 1A. Within the home 132 may be a set-top box 134 communicatively linked to a video display 136. The set-top box 134 may include a first decoder 138 and a second decoder 140. The first and second decoders 138 and 140 may be communicatively linked to a user interface 142 and a mass storage device 144. The user interface 142 may be communicatively linked to the video display 136.

During operation, head end 100 may receive local and nonlocal programming video signals from the satellite dish 112 and the local station 114. The nonlocal programming video signals may be received in the form of a digital video stream, while the local programming video signals may be received as an analog video stream. In some embodiments, local programming may also be received as a digital video stream. The digital video stream may be decoded by the decoder 104 and sent to the switcher 102 in response to customer requests. The head end 100 may also include a server 108 communicatively linked to a mass storage device 110. The mass storage device 110 may store various types of video content, including video on demand (VOD), which the server 108 may retrieve and provide to the switcher 102. The switcher 102 may route local programming directly to the modulators 118, which modulate the local programming, and route the non-local programming (including any VOD) to the encoders 116. The encoders 116 may digitally encode the non-local programming. The encoded non-local programming may then be transmitted to the modulators 118. The combiner 120 may be configured to receive the modulated analog video data and the modulated digital video data, combine the video data and transmit it via multiple radio frequency (RF) channels to the HFC network 122.

The HFC network 122 may transmit the combined video data to the nodes 124, 126 and 128, which may retransmit the data to their respective neighborhoods 129, 130 and 131. The home 132 may receive this video data at the set-top box 134, more specifically at the first decoder 138 and the second decoder 140. The first and second decoders 138 and 140 may decode the digital portion of the video data and provide the decoded data to the user interface 142, which then may provide the decoded data to the video display 136.

The encoders 116 and the decoders 138 and 140 of FIG. 1A (as well as all of the other steps and functions described herein) may be implemented as computer code comprising computer readable instructions stored on a computer readable storage device, such as memory or another type of storage device. The computer code may be executed on a computer system by a processor, such as an application-specific integrated circuit (ASIC), or other type of circuit. For example, computer code for implementing the encoders 116 may be executed on a computer system (such as a server) residing in the headend 100. Computer code for the decoders 138 and 140, on the other hand, may be executed on the set-top box 134, which constitutes a type of computer system. The code may exist as software programs comprised of program instructions in source code, object code, executable code or other formats. It should be appreciated that the computer code for the various components shown in FIG. 1A may reside anywhere in system 10 or elsewhere (such as in a cloud network), that is determined to be desirable or advantageous. Furthermore, the computer code may be located in one or more components, provided the instructions may be effectively performed by the one or more components.

Figure 1B:
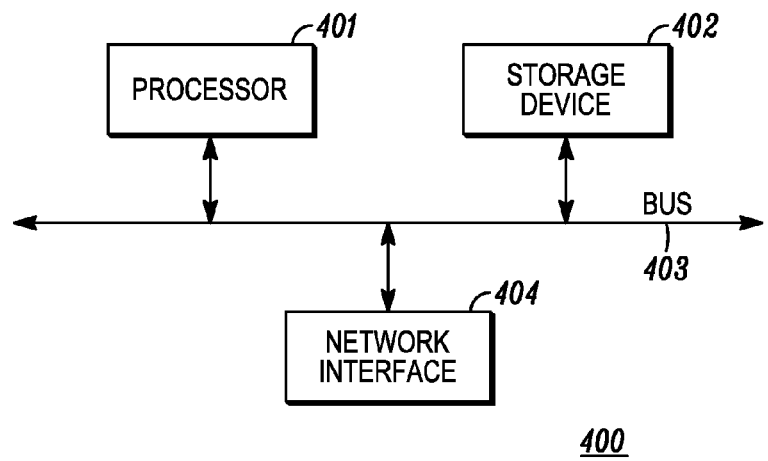
FIG. 1B is a computer system on which embodiments of the disclosure may be implemented.

FIG. 1B shows an example of a computer system on which computer code for the encoders 116 and the decoders 138 and 140 may be executed. The computer system, generally labeled 400, includes a processor 401, or processing circuitry, that may implement or execute software instructions performing some or all of the methods, functions and other steps described herein. Commands and data from processor 401 may be communicated over a communication bus 403, for example. Computer system 400 may also include a computer readable storage device 402, such as random access memory (RAM), where the software and data for processor 401 may reside during runtime. Storage device 402 may also include non-volatile data storage. Computer system 400 may include a network interface 404 for connecting to a network. Other known electronic components may be added or substituted for the components depicted in the computer system 400. The computer system 400 may reside in the headend 100 and execute the encoders 116, and may also be embodied in the set-top box 134 to execute the decoders 138 and 140. Additionally, the computer system 400 may reside in places other than the headend 100 and the set-top box 134, and may be miniaturized so as to be integrated into a smartphone or tablet computer.

Video encoding systems achieve compression by removing redundancy in the video data, e.g., by removing those elements that can be discarded without adversely affecting reproduction fidelity. Because video signals take place in time and space, most video encoding systems exploit both temporal and spatial redundancy present in these signals. Typically, there is high temporal correlation between successive frames. This is also true in the spatial domain for pixels which are close to each other. Thus, high compression gains are achieved by carefully exploiting these spatio-temporal correlations.

Figure 2A:
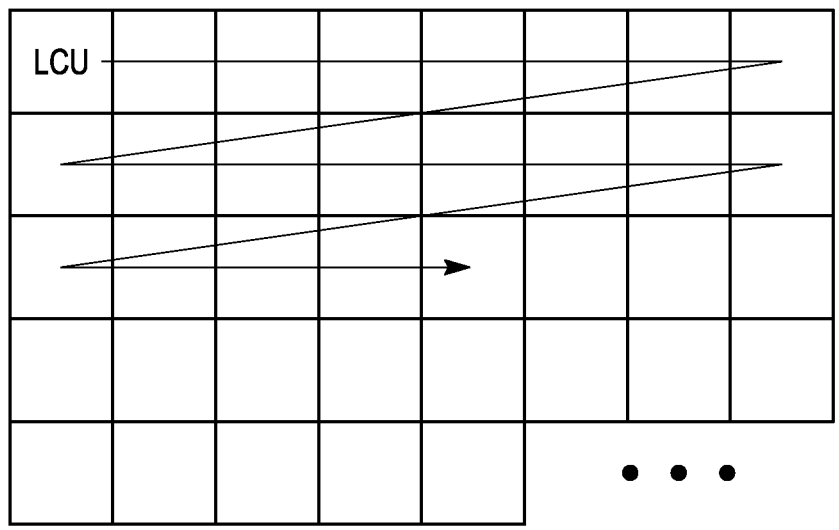
FIGS. 2A, 2B, 3A and 3B illustrate certain video encoding principles according to embodiments of the disclosure.
Figure 3A:
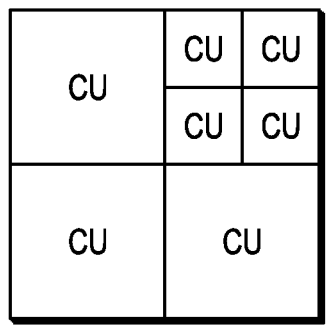

A high-level description of how video data gets encoded and decoded by the encoders 116 and the decoders 138 and 140 in an embodiment of the disclosure will now be provided. In this embodiment, the encoders and decoders operate according to a High Efficiency Video Coding (HEVC) method. HEVC is a block-based hybrid spatial and temporal predictive coding method. In HEVC, an input picture is first divided into square blocks, called LCUs (largest coding units) or CTUs (coding tree units), as shown in FIG. 2A. Unlike other video coding standards, in which the basic coding unit is a macroblock of 16×16 pixels, in HEVC, the LCU can be as large as 128×128 pixels. An LCU can be divided into four square blocks, called CUs (coding units), which are a quarter of the size of the LCU. Each CU can be further split into four smaller CUs, which are a quarter of the size of the original CU. The splitting process can be repeated until certain criteria are met. FIG. 3A shows an example of LCU partitioned into CUs.

Figure 3B:
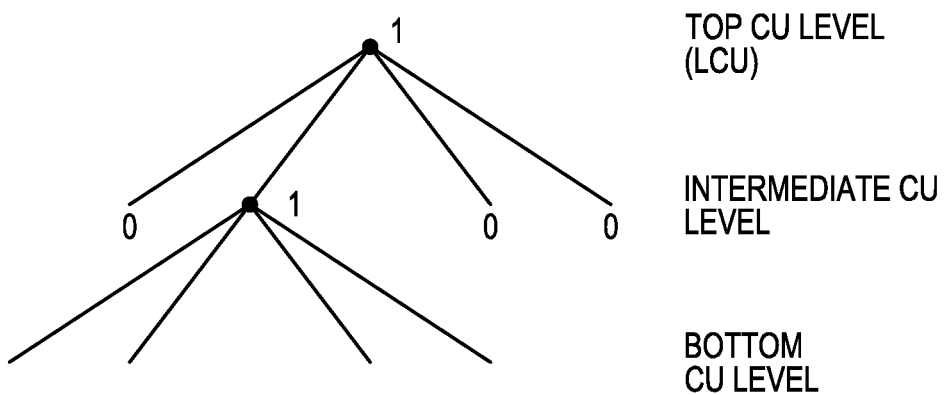

How a particular LCU is split into CUs can be represented by a quadtree. At each node of the quadtree, a flag is set to "1" if the node is further split into sub-nodes. Otherwise, the flag is unset at "0." For example, the LCU partition of FIG. 3A can be represented by the quadtree of FIG. 3B. These "split flags" may be jointly coded with other flags in the video bitstream, including a skip mode flag, a merge mode flag, and a predictive unit (PU) mode flag, and the like. In the case of the quadtree of FIG. 3B, the split flags 10100 could be coded as overhead along with the other flags. Syntax information for a given CU may be defined recursively, and may depend on whether the CU is split into sub-CUs.

Figure 2B:
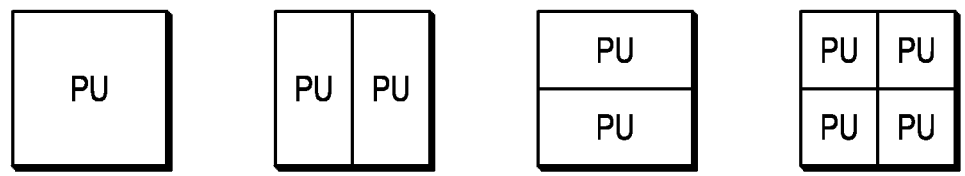

A CU that is not split (e.g., a CU corresponding a terminal, or "leaf" node in a given quadtree) may include one or more prediction units (PUs). In general, a PU represents all or a portion of the corresponding CU, and includes data for retrieving a reference sample for the PU for purposes of performing prediction for the CU. Thus, at each leaf of a quadtree, a final CU of 2N×2N can possess one of four possible patterns (N×N, N×2N, 2N×N and 2N×2N), as shown in FIG. 2B. While shown for a 2N×2N CU, other PUs having different dimensions and corresponding patterns (e.g., square or rectangular) may be used. A CU can be either spatially or temporally predictive coded. If a CU is coded in intra mode, each PU of the CU can have its own spatial prediction direction. If a CU is coded in inter mode, each PU of the CU can have its own motion vector(s) and associated reference picture(s). The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the CU defining the one or more PUs of the CU may also describe, for example, partitioning of the CU into the one or more PUs. Partitioning modes may differ between whether the CU is uncoded, intra-prediction mode encoded, or inter-prediction mode encoded.

In general, in intra-prediction encoding, a high level of spatial correlation is present between neighboring blocks in a frame. Consequently, a block can be predicted from the nearby encoded and reconstructed blocks, giving rise to the intra prediction. In some embodiments, the prediction can be formed by a weighted average of the previously encoded samples, located above and to the left of the current block. The encoder may select the mode that minimizes the difference or cost between the original and the prediction and signals this selection in the control data.

In general, in inter-prediction encoding, video sequences have high temporal correlation between frames, enabling a block in the current frame to be accurately described by a region in the previous coded frames, which are known as reference frames. Inter-prediction utilizes previously encoded and reconstructed reference frames to develop a prediction using a block-based motion estimation and compensation technique.

Following intra-predictive or inter-predictive encoding to produce predictive data and residual data, and following any transforms (such as the 4×4 or 8×8 integer transform used in H.264/AVC or a discrete cosine transform (DCT)) to produce transform coefficients, quantization of transform coefficients may be performed. Quantization generally refers to a process in which transform coefficients are quantized to possibly reduce the amount of data used to represent the coefficients, e.g., by converting high precision transform coefficients into a finite number of possible values. These steps will be discussed in more detail below.

Figure 5A:
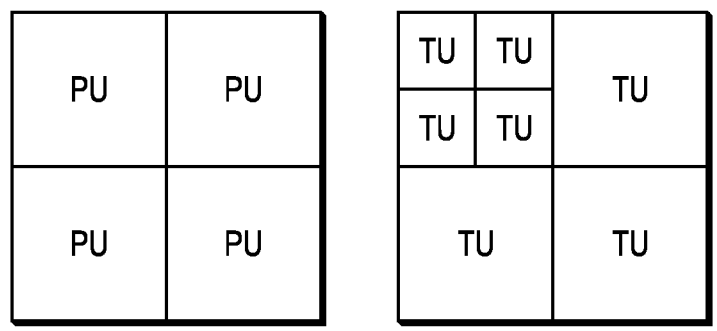
FIGS. 5A and 5B illustrate further video coding principles according to an embodiments of the disclosure.
Figure 5B:
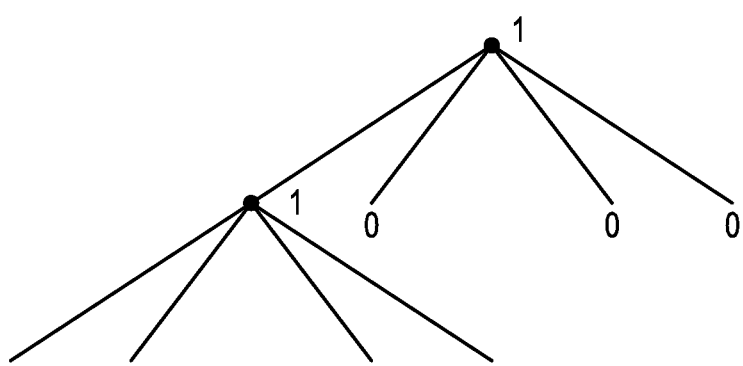

Each CU can also be divided into transform units (TUs) by application of a block transform operation. A block transform operation tends to decorrelate the pixels within the block and compact the block energy into the low order coefficients of the transform block. In some embodiments, one transform of 8×8 or 4×4 may be applied. In other embodiments, a set of block transforms of different sizes may be applied to a CU, as shown in FIG. 5A where the left block is a CU partitioned into PUs and the right block is the associated set of transform units (TUs). The size and location of each block transform within a CU is described by a separate quadtree, called RQT. FIG. 5B shows the quadtree representation of TUs for the CU in the example of FIG. 5A. In this example, 11000 is coded and transmitted as part of the overhead.

The TUs and PUs of any given CU may be used for different purposes. TUs are typically used for transformation, quantizing and coding operations, while PUs are typically used for spatial and temporal prediction. There is not necessarily a direct relationship between the number of PUs and the number of TUs for a given CU.

Video blocks may comprise blocks of pixel data in the pixel domain, or blocks of transform coefficients in the transform domain, e.g., following application of a transform, such as a discrete cosine transform (DCT), an integer transform, a wavelet transform, or a conceptually similar transform to residual data for a given video block, wherein the residual data represents pixel differences between video data for the block and predictive data generated for the block. In some cases, video blocks may comprise blocks of quantized transform coefficients in the transform domain, wherein, following application of a transform to residual data for a given video block, the resulting transform coefficients are also quantized. In video encoding, quantization is the step that introduces loss, so that a balance between bitrate and reconstruction quality can be established. These steps will be discussed further below.

Block partitioning serves an important purpose in block-based video coding techniques. Using smaller blocks to code video data may result in better prediction of the data for locations of a video frame that include high levels of detail, and may therefore reduce the resulting error (e.g., deviation of the prediction data from source video data), represented as residual data. In general, prediction exploits the spatial or temporal redundancy in a video sequence by modeling the correlation between sample blocks of various dimensions, such that only a small difference between the actual and the predicted signal needs to be encoded. A prediction for the current block is created from the samples which have already been encoded. While potentially reducing the residual data, such techniques may, however, require additional syntax information to indicate how the smaller blocks are partitioned relative to a video frame, and may result in an increased coded video bitrate. Accordingly, in some techniques, block partitioning may depend on balancing the desirable reduction in residual data against the resulting increase in bitrate of the coded video data due to the additional syntax information.

In general, blocks and the various partitions thereof (e.g., sub-blocks) may be considered video blocks. In addition, a slice may be considered to be a plurality of video blocks (e.g., macroblocks, or coding units), and/or sub-blocks (partitions of macroblocks, or sub-coding units). Each slice may be an independently decodable unit of a video frame. Alternatively, frames themselves may be decodable units, or other portions of a frame may be defined as decodable units. Furthermore, a GOP, also referred to as a group of pictures, may be defined as a decodable unit.

Figure 4A:
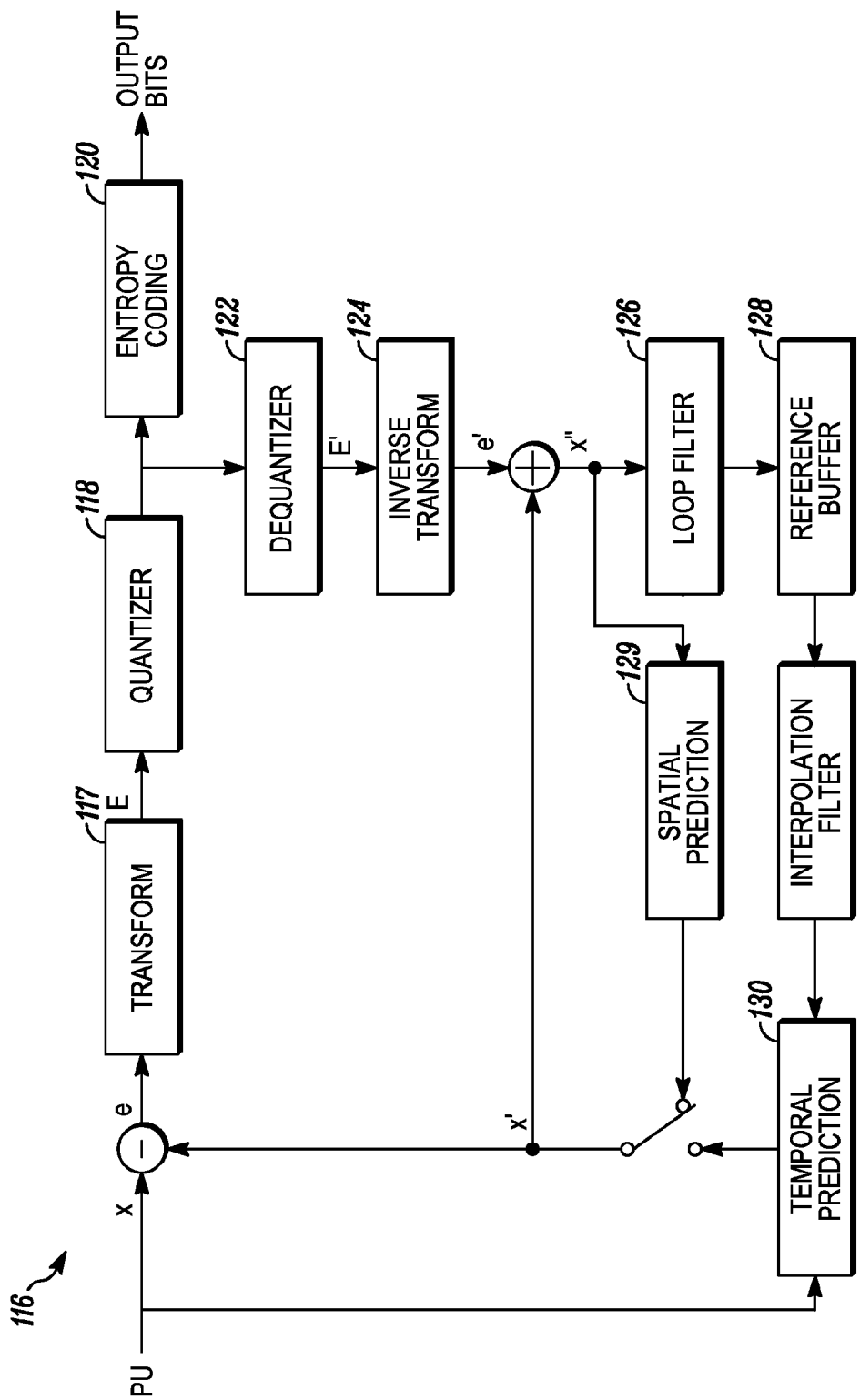
FIGS. 4A and 4B show possible architectures for an encoder and a decoder according to embodiments of the disclosure.
Figure 4B:
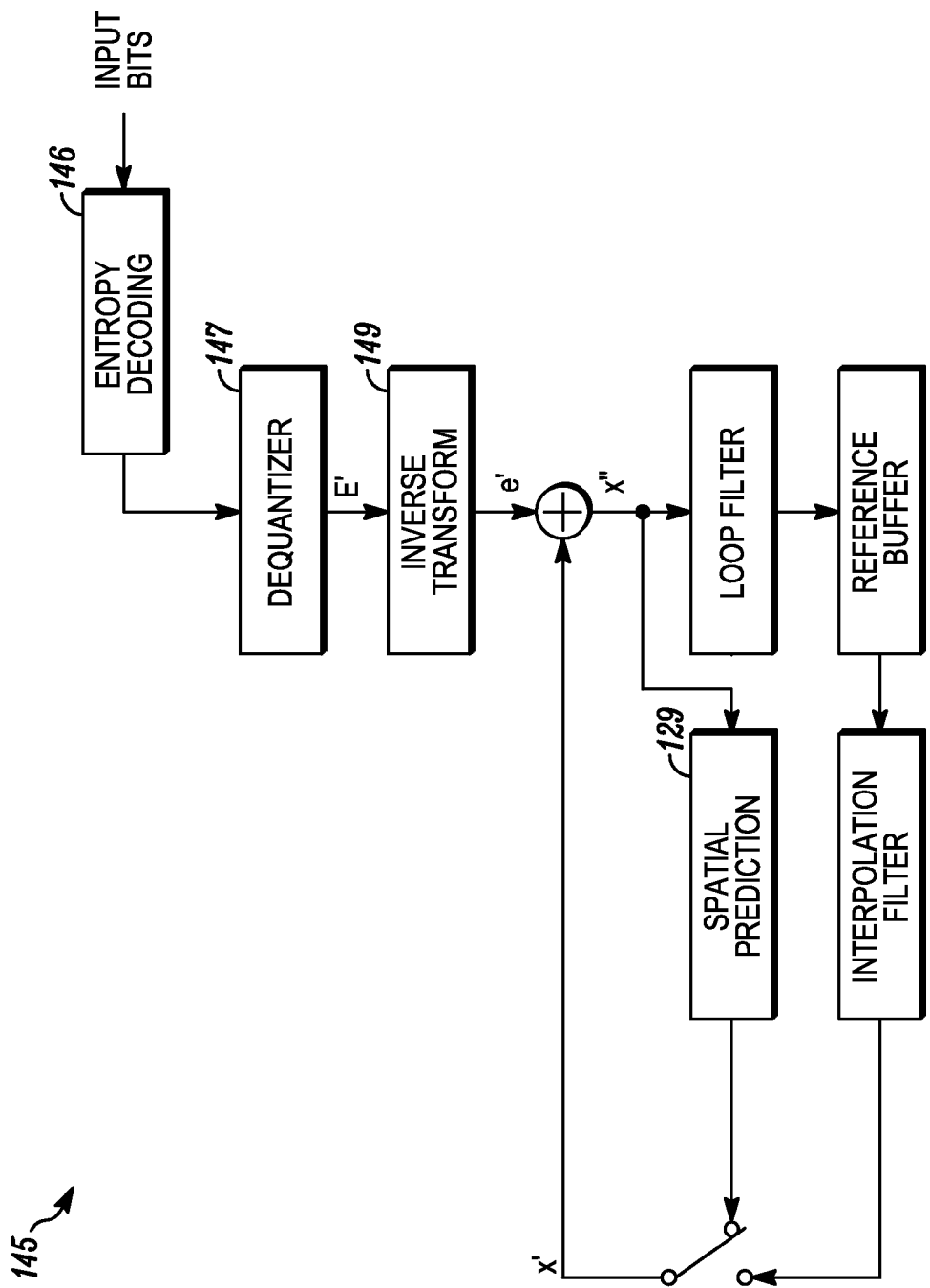

The encoders 116 (FIG. 1A) may be, according to an embodiment of the disclosure, composed of several functional modules as shown in FIG. 4A. These modules may be implemented as hardware, software, or any combination of the two. Given a current PU, x, a prediction PU, x', may first be obtained through either spatial prediction or temporal prediction. This spatial or temporal prediction may be performed by a spatial prediction module 129 or a temporal prediction module 130 respectively.

There are several possible spatial prediction directions that the spatial prediction module 129 can perform per PU, including horizontal, vertical, 45-degree diagonal, 135-degree diagonal, DC, Planar, etc. Including the Luma intra modes, an additional mode, called IntraFromLuma, may be used for the Chroma intra prediction mode. A syntax indicates the spatial prediction direction per PU.

The encoder 116 (FIG. 1A) may perform temporal prediction through motion estimation operation. Specifically, the temporal prediction module 130 (FIG. 4A) may search for a best match prediction for the current PU over reference pictures. The best match prediction may be described by motion vector (MV) and associated reference picture (refIdx). Generally, a PU in B pictures can have up to two MVs. Both MV and refIdx may be part of the syntax in the bitstream.

The prediction PU may then be subtracted from the current PU, resulting in the residual PU, e. The residual PU, e, may then be transformed by a transform module 117, one transform unit (TU) at a time, resulting in the residual PU in the transform domain, E. To accomplish this task, the transform module 117 may use e.g., either a square or a non-square block transform.

Referring back to FIG. 4A, the transform coefficients E, may then be quantized by a quantizer module 118, converting the high precision transform coefficients into a finite number of possible values. The quantization process may reduce the bit depth associated with some or all of the coefficients. For example, an n-bit value may be rounded down to an m-bit value during quantization, where n is greater than m. In some embodiments, external boundary conditions are used to produce modified one or more transform coefficients. For example, a lower range or value may be used in determining if a transform coefficient is given a nonzero value or just zeroed out. As should be appreciated, quantization is a lossy operation and the loss by quantization generally cannot be recovered.

The quantized coefficients may then be entropy coded by an entropy coding module 120, resulting in the final compression bits. The specific steps performed by the entropy coding module 120 will be discussed below in more detail.

To facilitate temporal and spatial prediction, the encoder 116 may also take the quantized transform coefficients E and dequantize them with a dequantizer module 122 resulting in the dequantized transform coefficients E'. The dequantized transform coefficients are then inverse transformed by an inverse transform module 124, resulting in the reconstructed residual PU, e'. The reconstructed residual PU, e', is then added to the corresponding prediction, x', either spatial or temporal, to form a reconstructed PU, x".

Referring still to FIG. 4A, a deblocking filter (DBF) operation may be performed on the reconstructed PU, x", first to reduce blocking artifacts. A sample adaptive offset (SAO) process may be conditionally performed after the completion of the deblocking filter process for the decoded picture, which compensates the pixel value offset between reconstructed pixels and original pixels. In some embodiments, both the DBF operation and SAO process are implemented by adaptive loop filter functions, which may be performed conditionally by a loop filter module 126 over the reconstructed PU. In some embodiments, the adaptive loop filter functions minimize the coding distortion between the input and output pictures. In some embodiments, loop filter module 126 operates during an inter-picture prediction loop. If the reconstructed pictures are reference pictures, they may be stored in a reference buffer 128 for future temporal prediction.

HEVC specifies two loop filters that are applied in order with the de-blocking filter (DBF) applied first and the sample adaptive offset (SAO) filter applied afterwards. The DBF is similar to the one used by H.264/MPEG-4 AVC but with a simpler design and better support for parallel processing. In HEVC the DBF only applies to an 8×8 sample grid while with H.264/MPEG-4 AVC the DBF applies to a 4×4 sample grid. DBF uses an 8×8 sample grid since it causes no noticeable degradation and significantly improves parallel processing because the DBF no longer causes cascading interactions with other operations. Another change is that HEVC only allows for three DBF strengths of 0 to 2. HEVC also requires that the DBF first apply horizontal filtering for vertical edges to the picture and only after that does it apply vertical filtering for horizontal edges to the picture. This allows for multiple parallel threads to be used for the DBF.

The SAO filter process is applied after the DBF and is made to allow for better reconstruction of the original signal amplitudes by using e.g., a look up table that includes some parameters that are based on a histogram analysis made by the encoder. The SAO filter has two basic types which are the edge offset (EO) type and the band offset (BO) type. One of the SAO types can be applied per coding tree block (CTB). The edge offset (EO) type has four sub-types corresponding to processing along four possible directions (e.g., horizontal, vertical, 135 degree, and 45 degree). For a given EO sub-type, the edge offset (EO) processing operates by comparing the value of a pixel to two of its neighbors using one of four different gradient patterns. An offset is applied to pixels in each of the four gradient patterns. For pixel values that are not in one of the gradient patterns, no offset is applied. The band offset (BO) processing is based directly on the sample amplitude which is split into 32 bands. An offset is applied to pixels in 16 of the 32 bands, where a group of 16 bands corresponds to a BO sub-type. The SAO filter process was designed to reduce distortion compared to the original signal by adding an offset to sample values. It can increase edge sharpness and reduce ringing and impulse artifacts. Further detail on the SAO process will be discussed below with reference to FIGS. 6-9.

In an embodiment of the disclosure, intra pictures (such as an I picture) and inter pictures (such as P pictures or B pictures) are supported by the encoder 116 (FIG. 1A). An intra picture may be coded without referring to other pictures. Hence, spatial prediction may be used for a CU/PU inside an intra picture. An intra picture provides a possible point where decoding can begin. On the other hand, an inter picture generally aims for high compression. Inter picture supports both intra and inter prediction. A CU/PU in inter picture is either spatially or temporally predictive coded. Temporal references are the previously coded intra or inter pictures.

The operation of the entropy coding module 120 (FIG. 4A) according to an embodiment will now be described in more detail. The entropy coding module 120 takes the quantized matrix of coefficients received from the quantizer module 118 and uses it to generate a sign matrix that represents the signs of all of the quantized coefficients and to generate a significance map. A significance map may be a matrix in which each element specifies the position(s) of the non-zero quantized coefficient(s) within the quantized coefficient matrix. Specifically, given a quantized 2D transformed matrix, if the value of a quantized coefficient at a position (y, x) is non-zero, it may be considered as significant and a "1" is assigned for the position (y, x) in the associated significance map. Otherwise, a "0" is assigned to the position (y, x) in the significance map.

Once the entropy coding module 120 has created the significance map, it may code the significance map. In one embodiment, this is accomplished by using a context-based adaptive binary arithmetic coding (CABAC) technique. In doing so, the entropy coding module 120 scans the significance map along a scanning line and, for each entry in the significance map, the coding module chooses a context model for that entry. The entropy coding module 120 then codes the entry based on the chosen context model. That is, each entry is assigned a probability based on the context model (the mathematical probability model) being used. The probabilities are accumulated until the entire significance map has been encoded.

The value output by the entropy coding module 120 as well as the entropy encoded signs, significance map and non-zero coefficients may be inserted into the bitstream by the encoder 116 (FIG. 1A). This bitstream may be sent to the decoders 138 and 140 over the HFC network 122.

It should be noted that the prediction, transform, and quantization described above may be performed for any block of video data, e.g., to a PU and/or TU of a CU, or to a macroblock, depending on the specified coding standard.

When the decoders 138 and 140 (FIG. 1A) receive the bitstream, they perform the functions shown in e.g., FIG.

4B. An entropy decoding module 146 of the decoder 145 may decode the sign values, significance map and non-zero coefficients to recreate the quantized and transformed coefficients. In decoding the significance map, the entropy decoding module 146 may perform the reverse of the procedure described in conjunction with the entropy coding module 120—decoding the significance map along a scanning pattern made up of scanning lines. The entropy decoding module 146 then may provide the coefficients to a dequantizer module 147, which dequantizes the matrix of coefficients, resulting in E'. The dequantizer module 147 may provide the dequantized coefficients to an inverse transform module 149. The inverse transform module 149 may perform an inverse transform operation on the coefficients resulting in e'. Filtering and spatial prediction may be applied in a manner described in conjunction with FIG. 4A.

Sample Adaptive Offset (SAO)

In an SAO process, an offset is added to each pixel to reduce the distortion of the reconstructed pixel relative to the original pixel. In one embodiment, for a partition in a luma or chroma component, an encoder categorizes the pixels into one of six possible types (both types and sub-types are collectively referred to as types here): four edges offset (EO) types E0, E1, E2, E3 and two band offset (BO) types B0, B1. For the EO types, the pixels are further sub-categorized into one of five possible sub-classes based upon local behavior along the EO type direction. For the BO types, the pixels are further sub-categorized into one of sixteen possible sub-classes based upon intensity. In some embodiments, for a given sub-class of pixels within an SAO type, the same offset is applied. For example, if the offset for sub-class i is then the SAO output corresponding to an input of $p_i$ will be $p_i+o_i$. The encoder typically selects the SAO type per sub-class to minimize a cost function. For example, if the distortion for a given type t and set of offsets $o_{t,i}$ is $D_{t,i}$ and the corresponding bitrate is $R_{t,i}$, then the cost function can be $J_{t,i}=D_{t,i}+\text{lambda}*R_{t,i}$, where lambda is a weighting factor. The encoder may signal to the decoder the SAO type per partition and the corresponding offsets per sub-class, and the decoder may perform the classification for the SAO type and applies the offsets per sub-class to each pixel. The SAO type can be signaled per color component, or a given type can be signaled and used for more than one color component. In some embodiments, it is also possible for the encoder to not use or turn off SAO, and this can also be signaled to the decoder.

Coding of SAO Type

For coding of SAO type, there are generally two coding methods: high efficiency (HE) and low complexity (LC). In LC, variable length codewords (VLCs) or binarized codewords are assigned to the SAO types; while in HE, the binarized codeword typically assigned to the type is followed by context-based adaptive binary arithmetic coding (CABAC). For the HE case, an encoder may signal the SAO type using a unary code, for example (0's and 1's can be interchanged) as shown in Table 1:

TABLE 1

| SAO type | Code |
| --- | --- |
| Off | 0 |
| E0 | 10 |
| E1 | 110 |
| E2 | 1110 |
| E3 | 11110 |

TABLE 1-continued

| SAO type | Code |
| --- | --- |
| B0 | 111110 |
| B1 | 1111110 |

In Table 1, when SAO type is Off, no SAO is applied and the corresponding codeword is 0. The other codewords correspond to the other EO and BO types.

It may be noted that the units or digits within a codeword may be referred to as "bits" for LC and "bins" for HE. The difference in terminology is a result of applying CABAC to the codeword in the HE method. As used herein, "units" includes both bins and bits in codewords.

Note that for the code assignment of Table 1, it is possible to remove the last 0 in the code for SAO B1 for a code of 111111 since it is known that it is the last possible SAO type. In addition, because of the longer code word for the BO types, the band offset types (B0 and B1) may be unfairly biased against in the rate-distortion (RD) selection of the best type. This biasing may be the result of a particular offset type having a longer codeword length than another offset type.

Consequently, in some embodiments, an alternate code assignment for signaling SAO type is shown in Table 2:

TABLE 2

| SAO type | Code |
| --- | --- |
| Off | 0 |
| E0 | 1000 |
| E1 | 1001 |
| E2 | 1010 |
| E3 | 1011 |
| B0 | 110 |
| B1 | 111 |

In Table 2, if the first binary digit in binarization of the codeword, or bin, is 0, then the SAO type is Off and no SAO is applied. Otherwise, the first bin is 1 and either EO or BO is signaled. If the second bin is 0, then an EO type is signaled; otherwise, the second bin is 1 and a BO type is signaled. For the case of EO, two more bins are signaled to indicate one of four EO types, and for the case of BO, one more bin is signaled to indicate one of two BO types. This code assignment gives a fairer bit weighting for the different SAO types because the codeword lengths within the EO and BO types are uniform, meaning that the coding scheme is nonbiased between the different SAO types. Also, this codeword binarization allows for better probability modeling for the Off, EO, and BO types.

For the Low Complexity (LC) case, the encoder may signal the SAO type using an exponential-Goloumb code, for example (0's and 1's can be interchanged) as shown in Table 3:

TABLE 3

| SAO type | Code |
| --- | --- |
| Off | 1 |
| E0 | 010 |
| E1 | 011 |
| E2 | 00100 |
| E3 | 00101 |
| B0 | 00110 |
| B1 | 00111 |

An alternate code that gives the same code word length to all the EO types (E0, E1, E2, E3) is shown in Table 4:

TABLE 4

| SAO type | Code |
|---|---|
| Off | 1 |
| E0 | 00100 |
| E1 | 00101 |
| E2 | 00110 |
| E3 | 00111 |
| B0 | 010 |
| B1 | 011 |

Note that the code words for the EO types (or BO types) can be interchanged. It is also possible to achieve a more efficient code than shown in Table 4 by using a similar code as to the HE case as shown in Table 5:

TABLE 5

| SAO type | Code |
|---|---|
| Off | 1 |
| E0 | 0000 |
| E1 | 0001 |
| E2 | 0010 |
| E3 | 0011 |
| B0 | 010 |
| B1 | 011 |

Alternatively, in some embodiments, the same code in HE can be used for LC. For example, Table 5 is similar Table 2, except that the first bit in each codeword has been interchanged. In Table 5, if the first bit is 1, then the SAO type is Off and no SAO is applied. Otherwise, the first bit is 0 and either EO or BO is signaled. If the second bit is 0, then an EO type is signaled; otherwise, the second bit is 1 and a BO type is signaled. For the case of EO, two more bits are signaled to indicate one of four EO types, and for the case of BO, one more bit is signaled to indicate one of two BO types. In addition to using the same codewords in HE and LC, some of the binary digits in the codewords can be either processed using CABAC (as in HE) or without CABAC (as in LC).

In some embodiments, one bit may be used to signal the difference between EO and BO types (e.g. bit=0 signals an EO type, and bit=1 signals a BO type), as illustrated in the examples in Tables 2-5.

Figure 6:
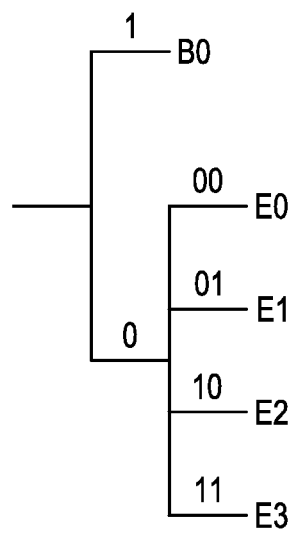
FIG. 6 shows an example variable length coding (VLC) signaling of edge offset/band offset (EO/BO) sample adaptive offset (SAO) type according to embodiments of the disclosure.

In some embodiments, there may be greater or fewer than the number of EO and/or BO types, as shown in above tables. For example, for the case of four EO types and one BO type, for LC this can be signaled as shown in FIG. 6. FIG. 6 illustrates the sequence of bits after signaling that SAO is not Off. This sequence of bits can be signaled for each color component, or the type can be used for more than one color component (e.g., luma or first chroma or second chroma component). In FIG. 6, if the first bit is 1, then BO is signaled. Otherwise, the first bit is 0 and one of the four EO types is signaled using two additional bits.

When signaling for a color component, the signaling may be repeated (possibly) for each of the three color components. Alternatively, the same parameter can be used for more than one color component.

Figure 7:
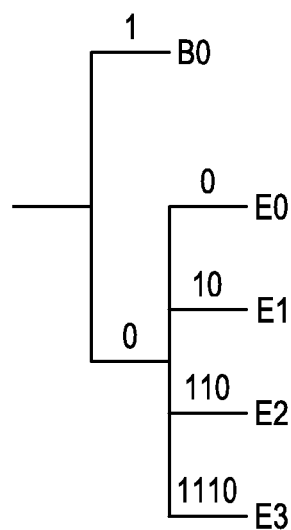
FIG. 7 shows an example CABAC signaling of EO/BO SAO type according to embodiments of the disclosure.

In still other embodiments, the EO/BO type can be signaled using an sao_band flag (e.g., 1 bit), where the SAO type is BO when sao_band equals 1 and is EO when sao_band equals 0. The SAO EO type can be signaled using sao_edge_type (e.g., 2 bits). For CABAC coding, the EO/BO type can also be signaled using a sao_band flag using its own dedicated context (e.g., per color component), and the EO type can be coded using unary binarization with one context (e.g., per color component). An example of this is shown in FIG. 7.

In some embodiments, the syntax for sao_band and sao_edge_type can be specified using VLC (LC) and CABAC (HE) as shown in Tables 6 and 7:

TABLE 6

| sao_offset_vlc( rx, ry, cIdx ) { | Descriptor |
|---|---|
| sao_band [ cIdx ][ rx ][ ry ] | u(1) |
| if( sao_band [ cIdx ][ rx ][ ry ] ) { | |
| ... | ... |
| } else { | |
| sao_edge_idx[ cIdx ][ rx ][ ry ] | u(2) |
| ... | ... |
| } | |
| } | |

TABLE 7

| sao_offset_cabac( rx, ry, cIdx ) { | Descriptor |
|---|---|
| sao_band [ cIdx ][ rx ][ ry ] | ae(v) |
| if( sao_band [ cIdx ][ rx ][ ry ] ) { | |
| ... | ... |
| } else { | |
| sao_edge_idx[ cIdx ][ rx ][ ry ] | ae(v) |
| ... | ... |
| } | |
| } | |

As presented in Tables 6 and 7, syntax element sao_band [cIdx][rx][ry] equal to 1 specifies that a band offset (BO) sample adaptive offset process is applied to the current coding treeblock at position rx and ry for the color component cIdx. In contrast, syntax element sao_band[cIdx][rx][ry] equal to 0 specifies that an edge offset (EO) sample adaptive offset process is applied to the current coding treeblock at position rx and ry for the color component cIdx. In some embodiments, sao_edge_idx[cIdx][rx][ry] indicates one of the four EO directions (sub-types or classes) of the current SAO unit at position rx and ry for the color component cIdx. In Tables 6 and 7, u( ) represents a unary binarization process and ae( ) represents a CABAC arithmetic coding process. In some embodiments, a combination of VLC (LC) and CABAC (HE) can be used to code the syntax elements.

In some embodiments, the SAO parameters such as sao_band and sao_edge_idx can be inferred from neighboring CTU SAO parameters, such as from neighbors to the above or left of the current CTU. A flag can be signaled to indicate whether the parameters are inferred from a particular neighbor. In some embodiments, sao_band and sao_edge_idx can be coded and signaled to the decoder using CABAC.

As disclosed herein, improvements for coding of SAO parameters may be achieved using codewords for encoding and decoding SAO type that provide for more efficient signaling, e.g., see Tables 2-5. Additional improvements may include: quantization of offsets that can better match some offset distributions, how to specify a single band offset type, how to efficiently encode offsets that can be beneficial when there are many empty sub-classes, and rate-distortion optimization of offsets.

Quantization of Offsets

For example, as described above, selection of SAO type/parameters allows an offset to be applied to each pixel in order to improve quality of the reconstructed image. Currently, the offset per sub-class is determined as the average distortion per pixel. That is, the total distortion d per sub-class is divided by the number of pixels in the class n, or d/n. The distortion is specified using a given bit depth precision and the offset value d/n is rounded, for example, offset value o=round(d/n). The offset value o can then be clipped to a minimum and maximum value, e.g. [−min, max].

In some embodiments, a modification may include truncating the offset value o instead of rounding, e.g., o=int(d/n), where o retains an integer value.

In other embodiments, a modification may include quantizing the offset values o. In general, non-linear quantization may be used that can distribute the offset levels (x) near where there are a larger occurrence of offsets. In an embodiment, linear quantization can be used in determining the offset levels, for example, x=round(o/scale), where scale is a parameter that controls the level of quantization and round( ) is a rounding operation to the nearest integer. The offset level x can be signaled to a decoder and the decoder can perform the inverse scaling to generate the reconstructed offset value o'=scale*x. If scale is greater than one, for a given number of reconstruction levels, a larger range of reconstructed offset values can be generated than when scale is less than or equal to one. Alternatively, this may allow for a given range of offsets to be covered using a smaller number of offset levels and require fewer bits to encode the offsets.

As is appreciated, quantization is a lossy operation, resulting in a reduction of precision. Although the precision of the offsets may be reduced, quantization of the offset values may closer match the statistics and range of the data. For example, for large coding QP values (e.g., low bit rates) where the coding is very lossy, scale values greater than one may be beneficial because larger errors in pixel values can be corrected using larger offset values.

In some embodiments, another way to achieve effective quantization of offsets is to use x=round(d/(n*scale)). Here, the scale value used for the quantization can be signaled to the decoder and can be determined for example per class, type, partition, LCU, slice (or other unit), picture, group of pictures, or sequence. The maximum scale value (or offset) can be sent or agreed upon the encoder and decoder for coding efficiency purposes and/or error resiliency purposes. Also, a flag can be used to indicate at some level (e.g. LCU, slice, or picture) whether the scale value is one or not, and if it is not one, it can be transmitted.

As explained above, the quantization of the offsets may better match the distribution of the offset data and improve rate-distortion (RD) performance. In linear quantization of the offsets, such as described above, the offset level can be computed by x=round(d/(n*scale)), where d is the total distortion in the sub-class, n is the number of pixels in the sub-class, and scale is a parameter controlling the step size of the quantization. The offset level x can be clipped at the encoder and the reconstructed offset value can be computed as o'=x*scale at both encoder and decoder.

For non-uniform or non-linear quantization of the offsets, the spacing between quantization offset values need not be uniform. For example, the offset level can be computed by x=f(d,n,scale, . . . ), where f( ) is some function, and the reconstructed offset value can be computed by o'=g(x, scale, . . . ), where g( ) is a some function. In particular, let x'=round(d/(n*scale)) be an input offset value. When scale=1, the reconstruction offset level x can be set to x=i if $b_i <= x' <= B_i$, where $I_{min} <= i <= I_{max}$, and the reconstructed offset value o' can be determined as $o'=g(x=i)=v_i$. The values $b_i$ and $B_i$ represent the lower and upper quantization boundaries for reconstruction offset level i, and $v_i$ represents the reconstructed offset value. The spacing among $b_i$'s, $B_i$'s and among $v_i$'s need not be uniform. In one example, when $I_{max}=-I_{min}=6$, when x'>=0, $b_0=0$, $B_0=0$, $b_1=1$, $B_1=1$, $b_2=2$, $B_2=2$, $b_3=3$, $B_3=5$, $b_4=6$, $B_4=11$, $b_5=12$, $B_5=23$, $b_6=24$, $B_6=255$, and when x'<0, $b_{-6}=-255$, $B_{-6}=-24$, $b_{-5}=-23$, $B_{-5}=-12$, $b_{-4}=-11$, $B_{-4}=-6$, $b_{-3}=-5$, $B_{-3}=-3$, $b_{-2}=-2$, $B_{-2}=-2$, $b_{-1}=-1$, $B_{-1}=-1$. For this case, the reconstructed offset value magnitudes when i>=0 can be set to $v_0=0$, and $v_i=2^{(i-1)}$ when i>0. For negative values of the offset level, i the reconstructed offset value has the same magnitude corresponding to level |i|, and the sign of the reconstructed offset value is the same as the sign of the offset level i.

Tables 8 and 9 illustrate the reconstruction offset level i, quantization boundaries $b_i$ and $B_i$, and reconstructed offset values $v_i$ for this example.

TABLE 8

| | i | | | | | | |
|---|---|---|---|---|---|---|---|
| | 0 | 1 | 2 | 3 | 4 | 5 | 6 |
| $b_i$ | 0 | 1 | 2 | 3 | 6 | 12 | 24 |
| $B_i$ | 0 | 1 | 2 | 5 | 11 | 23 | 255 |
| $v_i$ | 0 | 1 | 2 | 4 | 8 | 16 | 32 |

TABLE 9

| | i | | | | | |
|---|---|---|---|---|---|---|
| | −6 | −5 | −4 | −3 | −2 | −1 |
| $b_i$ | −255 | −23 | −11 | −5 | −2 | −1 |
| $B_i$ | −24 | −12 | −6 | −3 | −2 | −1 |
| $v_i$ | −32 | −16 | −8 | −4 | −2 | −1 |

Because the above paragraph presented an example, it is appreciated that there are other combinations of quantization parameter values $b_i$'s, $B_i$'s and $v_i$'s that can be chosen. For a given number of offset levels, a non-uniform distribution may offer a better rate-distortion tradeoff for a range of offsets. Different values may be used for different sequences, quality levels, bit rates, etc. Also, the quantization parameters can be different for the various SAO types. For example, for EO types, uniform quantization may be used, whereas for BO types, non-uniform quantization may be suitable. In addition, different quantization values can be chosen for different ranges of offset values. For example, small (magnitude) offset values may use uniform quantization with a given scale value, whereas larger offset values may use non-uniform quantization or uniform quantization with another scale value.

Merging of B0 and B1

In some embodiments, SAO uses two fixed band types, B0 and B1, covering the entire intensity range, with each band further dividing the respective intensity range into 16 equal sub-classes. An offset can be signaled for each of the sub-classes. Because the statistics of a given picture may not fall nicely into one of the two existing band types, B0 and B1, it may be preferable to combine or merge the bands. In some embodiments, one band type can be used, where the range of values to apply an offset can be specified, and a number of sub-classes for the range can be specified, e.g., using a uniform sub-partitioning. An example of such partitioning using a single band type is illustrated in FIG. 8.

In some embodiments, the range of values where the offset is applied can be determined based on the data and on rate-distortion considerations. The offsets may generally be applied to values where the distortion can be reduced.

In some embodiments, SAO selection type need not be performed, such as when there is a single band type and no other SAO type. In such instances, the single band type is used without the additional steps associated with SAO selection.

Figure 8:
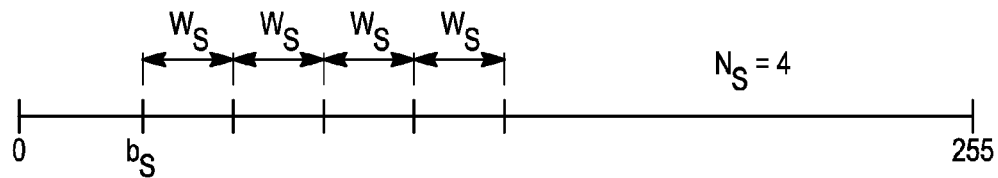
FIG. 8 shows an example band offset specification according to embodiments of the disclosure.

As shown in FIG. 8, the start of the band is specified by $b_s$, and $N_s$ sub-classes of width $w_s$ can be used. FIG. 8 shows one embodiment where four ($N_s$=4) sub-classes of equal width ($w_s$) adjoining each other, where the first sub-class starts at $b_s$. In this case, four offsets can be signaled to the decoder for the four sub-classes. In one example, if the last sub-class exceeds the maximum intensity range, the last sub-class can end at the maximum value or wrap around to zero.

Alternatively, a fixed set of values of $b_s$, $N_s$ and/or $w_s$ can be specified and agreed upon at the encoder and/or decoder. In such embodiments, only some parameters (e.g., the unspecified values) may need to be transmitted from the encoder to decoder. For example, these parameters can be signaled to the decoder and can be determined for e.g., per partition, LCU, slice (or other unit), picture, group of pictures, sequence, etc. In other embodiments, more than one band can be specified by repeating the same process for specifying a single band.

In some embodiments, $b_s$ is transmitted from the encoder to the decoder. In some embodiments, $N_s$ is transmitted from the encoder to the decoder. In some embodiments, $w_s$ is transmitted from the encoder to the decoder.

Coding of Offsets

In some embodiments, for the existing B0 and B1 band offset types and/or for a single merged band offset type, there may be many sub-classes with no pixels in the respective intensity range (e.g., also known as empty sub-classes). Although it is possible to encode these sub-classes with a zero offset, in some embodiments, only the offset values for those classes that have pixel intensity values are encoded and signaled. Such encoding of sub-classes that have pixel intensity values may be achieved by additionally encoding an escape code or end-of-offset code to signal no more offset values. This escape code can be, for example, a value that is larger than the maximum offset value used. This approach can be beneficial when there are many empty sub-classes; however, in cases where there are not many empty sub-classes, a combination of only encoding sub-classes having intensity pixel values and encoding sub-classes with a zero offset may be implemented. The approach can be used for signaling of offsets in both band offset and edge offset types. For the case of edge offset types, an empty sub-class corresponds to the case where there are no pixels with the respective gradient pattern.

As is appreciated, in one embodiment the decoder receives information on a band offset specification type such as shown in FIG. 8. The decoder classifies the reconstructed pixel values into the sub-classes according to their intensities. When the decoder receives the sequences of offset values, it can assign the offsets to each sub-class according to where pixel intensities exist in the sub-class.

Figure 9:
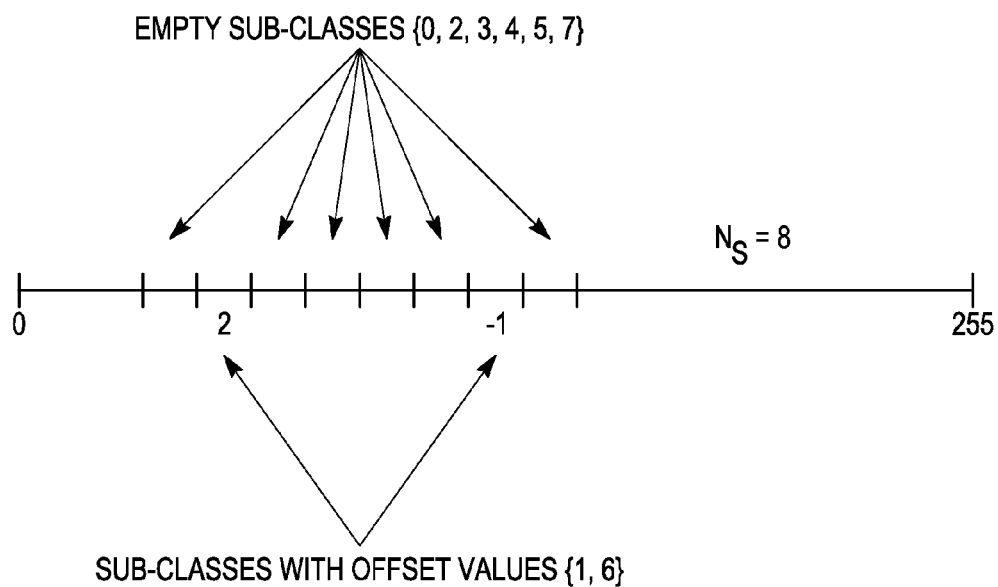
FIG. 9. shows an example architecture for coding of offsets according to embodiments of the disclosure.

In some embodiments, sub-classes where there are no pixel intensities will have no offset signaled. FIG. 9 illustrates this as an example. FIG. 9 shows an example of BO with eight sub-classes 0-7. The locations of the eight sub-classes or range of pixel amplitudes can be signaled to the decoder using methods previously described. In the example, there are only pixel intensities in sub-classes 1 and 6, while there are no pixel intensities in sub-classes 0, 2, 3, 4, 5, and 7. The latter classes are empty and so no offsets need to be signaled. The offset value of 2 for sub-class 1 and value of −1 for sub-class 6 can be signaled, followed by an optional escape value signaling no more offset values. If the escape value is not signaled, then it is assumed that the decoder performs pixel classification into sub-classes prior to parsing the offset values. After the decoder receives the information specifying the BO sub-classes using methods such as previously described, it can classify the pixel intensities. After classifying the pixel intensities, the decoder assigns the first offset value of 2 to the first non-empty sub-class of 1 and the second offset value of −1 to the second non-empty sub-class of 6.

Rate-Distortion Optimization of Offsets

As discussed above, if the distortion between the original and reconstructed data for a given type t and offset of class i ($o_{t,i}$) is $D_{t,i}$ and the corresponding bits required to transmit $o_{t,i}$ is $R_{t,i}$, then a corresponding cost function that weighs both distortion and bits can be $J_{t,i}=D_{t,i}+\text{lambda}*R_{t,i}$, where lambda is a Lagrangian weighting factor. For a given type t and sub-class i, the best offset $o_{t,i}$ can be chosen to minimize the cost $J_{t,i}$. This best offset for a given type and sub-class can be determined by computing the cost function for the different possible offsets and selecting the offset with the smallest cost value $J_{t,i}$.

In some embodiments, an initial offset can be chosen, and then a range of offsets around this initial offset can be searched for the minimum cost. For example, the initial offset can be set as the one that minimizes the distortion only, and then additional offsets can be checked for minimizing the cost. In some embodiments, the range of offsets searched includes those offsets that are smaller than the initial offset. It should be appreciated that the search to minimize the cost can be over offset values or offset levels, and that a given offset level corresponds to an offset value.

As described above, there are four possible EO types or classes, and five possible sub-classes per type. As used here, EO type or class refers to the direction along where pixels will be processed, and sub-class refers to the categorization of pixel values according to the gradient pattern along the EO type or class direction. In some embodiments, the number of EO sub-classes may be extended to a total of nine sub-classes, where each pixel is classified depending on whether it is smaller, equal, or larger than the two neighboring pixels along the direction indicated by EO type or class.

It should be appreciated that although the number of EO sub-classes was described as including nine, any suitable increased number (e.g., greater than five) may be used. Because of the additional number of sub-classes, more offsets may need to be sent to the decoder. Although more offsets may need to be sent for the additional sub-classes, the reduction in distortion may reduce the overall cost and improve performance.

As described herein, some improvements for coding and selection of SAO parameters include signaling EO and BO types, quantization of offsets, specification of BO parameters, and coding and rate-distortion optimization of offsets.

The above description of the disclosed embodiments is provided to enable any person skilled in the art to make or use the disclosure. Various modifications to these embodiments will be readily apparent to those skilled in the art, and the generic principles described herein can be applied to other embodiments without departing from the spirit or scope of the disclosure. Thus, it is to be understood that the description and drawings presented herein represent exemplary embodiments of the disclosure and are therefore representative of the subject matter which is broadly contemplated by the present disclosure. It is further understood that the scope of the present disclosure fully encompasses other embodiments and that the scope of the present disclosure is accordingly limited by nothing other than the appended claims.

What is claimed is:

1. A method for decoding a video bitstream having a plurality of pictures, the bitstream generated by a video coding system with sample adaptive offset, the method comprising:
   receiving a video bitstream;
   deriving processed video data from the bitstream;
   partitioning the processed video data into blocks, wherein each of the blocks is equal to or smaller than a picture;
   deriving a sample adaptive offset type from the video bitstream for each of the blocks, wherein the sample adaptive offset type is associated with a specific nonbiased coding scheme, wherein the sample adaptive offset type is selected from a group consisting of edge offset types and band offset types, wherein the edge offset types include at least four edge offset types, and wherein the specific nonbiased coding scheme is a specific nonbiased variable length coding scheme;
   determining a sample adaptive offset sub-class associated with the derived sample adaptive offset type for each of the pixels in each of the blocks, wherein the sample adaptive offset sub-class is a sub-class of the derived sample adaptive offset type;
   deriving an intensity offset from the video bitstream for the sub-class associated with the derived sample adaptive offset type;
   applying, by a processor in response to instructions stored on a non-transitory computer readable medium, sample adaptive offset compensation to each of the pixels in a processed video block, wherein the sample adaptive offset compensation is based on the intensity offset; and
   outputting a decoded video including the processed video block.

2. The method of claim 1, wherein the specific nonbiased coding scheme associated with the sample adaptive offset types includes a binary coding scheme having at least 2 units in each codeword.

3. The method of claim 2, wherein each codeword is associated with an individual sample adaptive offset type.

4. The method of claim 3, wherein the codeword includes a distinct first unit that indicates whether the sample adaptive offset type is in use.

5. The method of claim 4, wherein the codeword further includes a distinct second unit to identify if the sample adaptive offset type is a band offset type or an edge offset type.

6. The method of claim 5, wherein the codeword further includes a distinct third unit to identify an edge offset type.

7. The method of claim 2, wherein at least one of the units in the codeword is encoded using Context Adaptive Binary Arithmetic Coding.

8. The method of claim 6, wherein the distinct third unit consists of two binary digits to identify one of the at least four edge offset types.

9. The method of claim 1, wherein the specific nonbiased coding scheme associated with the sample adaptive offset types includes one or more flags associated with each of the sample adaptive offset types.

10. The method of claim 9, wherein applying sample adaptive offset compensation includes signaling at least one of the band offset type or edge offset type using a sample adaptive offset band flag.

11. The method of claim 9, wherein applying sample adaptive offset compensation includes signaling the sample adaptive offset type using a sample adaptive offset edge type flag.

12. The method of claim 9, wherein applying sample adaptive offset compensation includes signaling the sample adaptive offset type for a color coding component.

13. An apparatus for decoding a video bitstream having a plurality of pictures, the bitstream generated by a video coding system with sample adaptive offset, the apparatus comprising a video decoder configured to:
   receive a video bitstream;
   derive processed video data from the bitstream;
   partition the processed video data into blocks, wherein each of the blocks is equal to or smaller than a picture;
   derive a sample adaptive offset type from the video bitstream for each of the blocks, wherein the sample adaptive offset type is associated with a specific nonbiased coding scheme, wherein the sample adaptive offset type is selected from a group consisting of edge offset types and band offset types, wherein the edge offset types include at least four edge offset types, and wherein the specific nonbiased coding scheme is a specific nonbiased variable length coding scheme;
   determine a sample adaptive offset sub-class associated with the sample adaptive offset type for each of the pixels in each of the blocks, wherein the sample adaptive offset sub-class is a sub-class of the derived sample adaptive offset type;
   derive intensity offset from the video bitstream for the sub-class associated with the sample adaptive offset type;
   apply sample adaptive offset compensation to each of the pixels in a processed video block, wherein the sample adaptive offset compensation is based on the intensity offset; and
   output a decoded video including the processed video block.

14. The apparatus of claim 13, wherein the apparatus comprises at least one of:
   an integrated circuit;
   a microprocessor; and
   a wireless communication device that includes the video decoder.

15. The apparatus of claim 13, wherein the specific nonbiased coding scheme associated with the sample adaptive offset types includes a binary coding scheme having at least 2 units in each codeword.

16. The apparatus of claim 15, wherein the edge offset types and band offset types are represented by code words that are of roughly equivalent size.

17. A method of encoding video data having a plurality of pictures, using sample adaptive offset, the method comprising the steps of:
   partitioning video data into blocks, wherein each of the blocks is equal to or smaller than a picture;
   selecting a sample adaptive offset type for the video data for each of the blocks, wherein the sample adaptive offset type is associated with a specific nonbiased coding scheme, wherein the sample adaptive offset type is selected from a group consisting of edge offset types and band offset types, wherein the edge offset types include at least four edge offset types, and wherein the specific nonbiased coding scheme is a specific nonbiased variable length coding scheme;

selecting a sample adaptive offset sub-class associated with the sample adaptive offset type for each of the pixels in each of the blocks, wherein the sample adaptive offset sub-class is a sub-class of the selected sample adaptive offset type;

determining intensity offset for the video data for the sub-class associated with the sample adaptive offset type;

applying, by a processor in response to instructions stored on a non-transitory computer readable medium, sample adaptive offset compensation to each of the pixels in a processed video block, wherein the sample adaptive offset compensation is based on the intensity offset; and storing the processed video block as a reconstructed block.

* * * * *